United States Patent [19]
Asano et al.

[11] Patent Number: 5,793,988
[45] Date of Patent: Aug. 11, 1998

[54] PARALLEL DATA TRANSFER SYSTEM AND METHOD UTILIZING DIFFERENT MODULATING WAVEFORMS

[75] Inventors: Takeshi Asano, Atsugi; Shinichi Ikami, Yamato, both of Japan

[73] Assignee: International Business Machines Corporation, Armonk, N.Y.

[21] Appl. No.: 887,376

[22] Filed: Jul. 2, 1997

Related U.S. Application Data

[63] Continuation of Ser. No. 522,205, Aug. 30, 1995.

[30] Foreign Application Priority Data

Aug. 30, 1994 [JP] Japan .................................... 6-205093

[51] Int. Cl.$^6$ .................................................. G06F 13/00
[52] U.S. Cl. ........................................................ 395/280
[58] Field of Search .................................. 395/280, 309, 395/310

[56] References Cited

U.S. PATENT DOCUMENTS 5,105,444   4/1992   Gard ............................................ 375/49

FOREIGN PATENT DOCUMENTS

| 62-63327  | 3/1987  | Japan | G06F 1/04 |
| 3-297238  | 12/1991 | Japan | H04L 7/00 |
| 5-152908  | 6/1993  | Japan | H03K 5/04 |

*Primary Examiner*—Glenn A. Auve
*Attorney, Agent, or Firm*—Susan M. Murray; Daryl K. Neff

[57] ABSTRACT

Disclosed is a data transfer system that effectively reduces EMI radiation, in a device wherein EMI radiation very easily occurs, without the need for filters, etc. A system for transmitting data across a bus having a plurality of data lines includes a modulating circuit for modulating data so as to reduce the EMI radiation attributable to the data lines and a demodulating circuit for restoring the original data after transmission.

9 Claims, 10 Drawing Sheets

INTERFACE SIGNAL EXAMPLE FOR SIGNAL MODULATOR 100
(FOR 4-BIT DATA)
(NO DATA CONVERSION MODE)

INPUT/OUTPUT SIGNAL EXAMPLE OF 4-BIT COUNTER 410 OF
SIGNAL MODULATOR 100 (FOR 4-BIT DATA)
(DATA MODULATOR MODE)

INPUT/OUTPUT SIGNAL EXAMPLE OF 4-BIT ADDER 420
OF SIGNAL MODULATOR 100 (FOR 4-BIT DATA)
(DATA MODULATION MODE)

INPUT/OUTPUT SIGNAL OF ADDER 220
(FOR 4-BIT DATA)

INPUT/OUTPUT SIGNAL OF TIMING CONTROLLER
(FOR 4-BIT DATA)

PARALLEL DATA TRANSFER SYSTEM AND METHOD UTILIZING DIFFERENT MODULATING WAVEFORMS

This application is a continuation of U.S. patent application Ser. No. 08/522,205 filed Aug. 30, 1995.

FIELD OF THE INVENTION

The present invention relates to the reduction of EMI (Electro-Magnetic Interference) radiation for various types of electronic devices, such as computer systems, and more particularly relates to the reduction of EMI radiation for video interface circuits.

BACKGROUND

When a signal is transmitted along an interface cable, an electro-magnetic wave is irradiated. This electromagnetic wave is called extraneous radiation (EMI radiation), and its allowable limits are specified by international standards. EMI radiation from an interface circuit that includes a wide bus (e.g. a large number of signal lines or individual buses), such as an LCD video interface, increases in proportion to the number of signal lines in the bus.

As the transfer speed for interface signals, and more particularly, for video interface signals for liquid crystal displays (LCDs) increases, the bus width as well as the speeds for the signals transmitted across the bus also increase. For example, since an LCD bus normally communicates with an LCD module via an interface cable (bus) that consists of a plurality of data lines, EMI radiation attributable to this interface cable (bus) greatly affects the EMI radiation of the entire system. The EMI radiation attributable to the bus has the greatest impact on the system EMI radiation when the waveforms of the data transmitted across all the data lines of the bus are identical. Since the data lines of a bus in the LCD video interface correspond to luminescence, the data lines frequently all have the same value, for example, when it is desired to employ the display at the maximum luminescence. Since such occurrences are rather common, EMI radiation is a serious problem for LCD video interfaces.

There are three types of interface signals: (1) parallel data bus signals (data [1] ... data [n]), (2) sampling clocks (clock signals), and (3) synchronization signals (SYNC signals). For example, FIG. 12 shows a sample of interface signals as transmitted by a conventional interface circuit. N-bit data, data [1] through data [n] are transmitted. A clock signal is employed for timing the sampling of the data by a receiver. A synchronization signal (SYNC signal) is employed for informing the receiver of the start of data transmission. In this example, data [1] ... data [n]="00 ... 0" are transmitted at time T1; data "11 ... 1" are transmitted at time T2; data "00 ... 0" are transmitted at time T3; and data "11 ... 1" are transmitted at time T4.

More particularly, for a red-green-blue (RGB) video signal, for example, the three bits associated with the RGB color signals can be regarded as parallel data bus signals. A dot clock signal is added as a sampling clock signal for the interface. A horizontal synchronization signal can be employed as a sync signal.

In the alternative, for an LCD video signal, data signals for the colors red, green and blue (RGB) can be regarded as parallel data bus signals. More specifically, in the LCD, generally, each color signal (R,G, & B) has a plurality of bits, n, which determine the resolution of luminescence for the individual colors. The LCD video signal can be considered as a parallel data interface signal that is carried by 3×n bit data bus. A sampling clock signal is originally provided for the LCD interface. A conventional signal that indicates display timing can be employed as a sync signal.

As a conventional EMI countermeasure, filters are generally installed for each signal line of a bus. When there are many buses provided, however, the installation of such items as filters for all the data lines of the buses, as a means of providing an EMI countermeasure, increases manufacturing costs. Further, as much space is required for installation on a printed circuit board (PCB), the manufacturing costs for the board also rise. In addition, it must be considered that the installation of the filters must not deteriorate the quality of waveforms. Moreover, as the constant of a filter is limited by recent advances in the speed of buses, a satisfactory effect cannot be expected.

Such EMI radiation from an interface signal has the following characteristics:

(1) EMI radiation that occurs when digital signals having the same waveforms are transmitted as n interface signals is n times the radiation that accompanies the transmission of a digital signal as a single interface signal.

(2) The amount of EMI radiation that is produced is proportional to the frequency elements of a signal, and becomes greater as the rate of repetition of a signal is increased. For example, when a digital signal repeats HLHLHLHL, the EMI radiation with the greatest intensity occurs.

(3) EMI radiation increases with the length of the interface cable, which acts like an antenna for EMI radiation.

A video interface circuit for an LCD is a specific example of a digital parallel interface signal which exhibits the three characteristics recited above, thus resulting in maximum EMI radiation. For an LCD video signal, a plurality of data lines are provided that are employed to carry data signals that represent the luminescence of the individual RGB signals, the number of the data lines being determined by the color resolution of a pertinent system. To display white at its maximum luminescence on a screen, all the data lines carry the same waveforms. Thus, the first characteristic (1) is present. To repeatedly display the same characters on the screen, a short repetitive signal is transmitted. Thus, the second characteristic (2) is present. Since an LCD video signal usually has to be transmitted from the system to an LCD via a cable, the third characteristic (3) is also present.

OBJECTS

To overcome the above shortcomings, it is an object of the present invention to effectively reduce EMI radiation without requiring the employment of filters, etc., even under conditions where EMI radiation most easily occurs, such as at an LCD video interface.

It is a further object of the present invention to limit EMI radiation with the characteristics (1) through (3), by carrying the n interface signals in an interface cable by different waveforms and by causing the interface signals to have waveforms with a long repetitive cycle.

It is yet a further object of the present invention to provide an interface signal modulator for modulating data carried across an interface cable such that the interface signals are carried by different waveforms and have waveforms with a long repetitive cycle (which serves as an antenna (EMI generator)), and a receiver for demodulating the modulated signal to restore the original signal.

SUMMARY

According to the present invention, a system, which transfers data via a bus having a plurality of data lines, includes a circuit for reducing electromagnetic radiation emanating from the plurality of data lines of the bus by modulating the data carried on the plurality of data lines prior to transmission and a circuit for recovering the original data by receiving and demodulating the modulated data.

In another aspect of the invention, a computer system includes a data bus having a plurality of data lines for carrying data, a circuit for modulating the data prior to transmission across the bus, thereby randomizing the data, and a display device coupled to the bus for receiving and for demodulating the modulated data.

In a further aspect of the invention, a method for transmitting data across a bus includes modulating the data to be transmitted so as to randomize the data, transmitting the data and recovering the data by demodulating the modulated data.

BRIEF DESCRIPTION OF THE DRAWINGS

FIG. 11A shows EMI radiation without data modulation; FIG. 11B shows EMI radiation with data modulation.

DETAILED DESCRIPTION OF THE PREFERRED EMBODIMENTS

Figure 1:
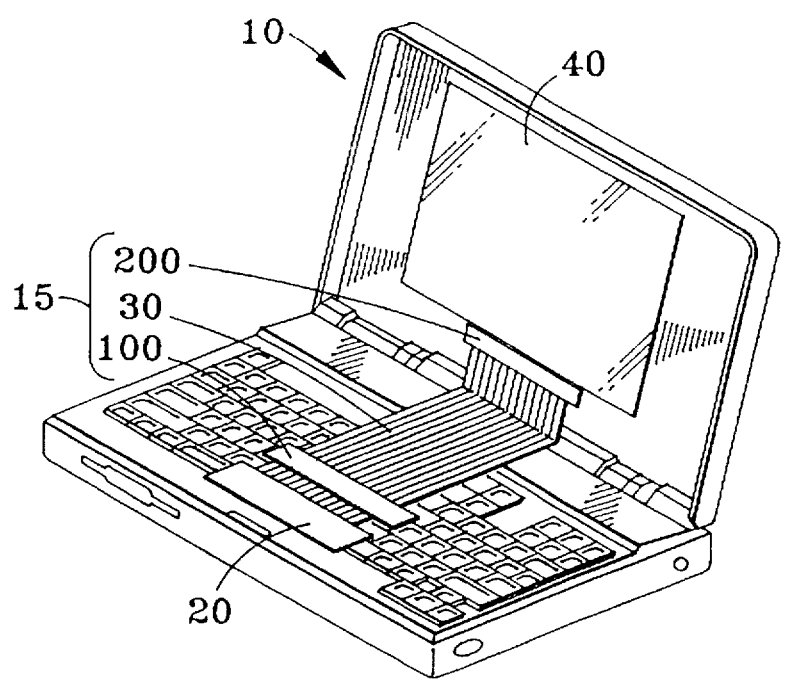
FIG. 1 is a diagram illustrating a computer system that has a data modulator and a data demodulator according to the present invention.

FIG. 1 is an illustration of a computer system 10 according to the present invention. The computer system 10 includes a data signal generator 20, which has a video signal generator, etc. A data signal produced by the data signal generator 20 is transmitted to a display device 40 via a data transfer system 15. The data transfer system 15 includes a signal demodulator 100 that randomizes received data signals. The randomized data signals are carried to a signal demodulator 200 by an interface cable 30. The signal demodulator 200 demodulates the received data and supplies the demodulated data signals to the display device 40.

Figure 2:
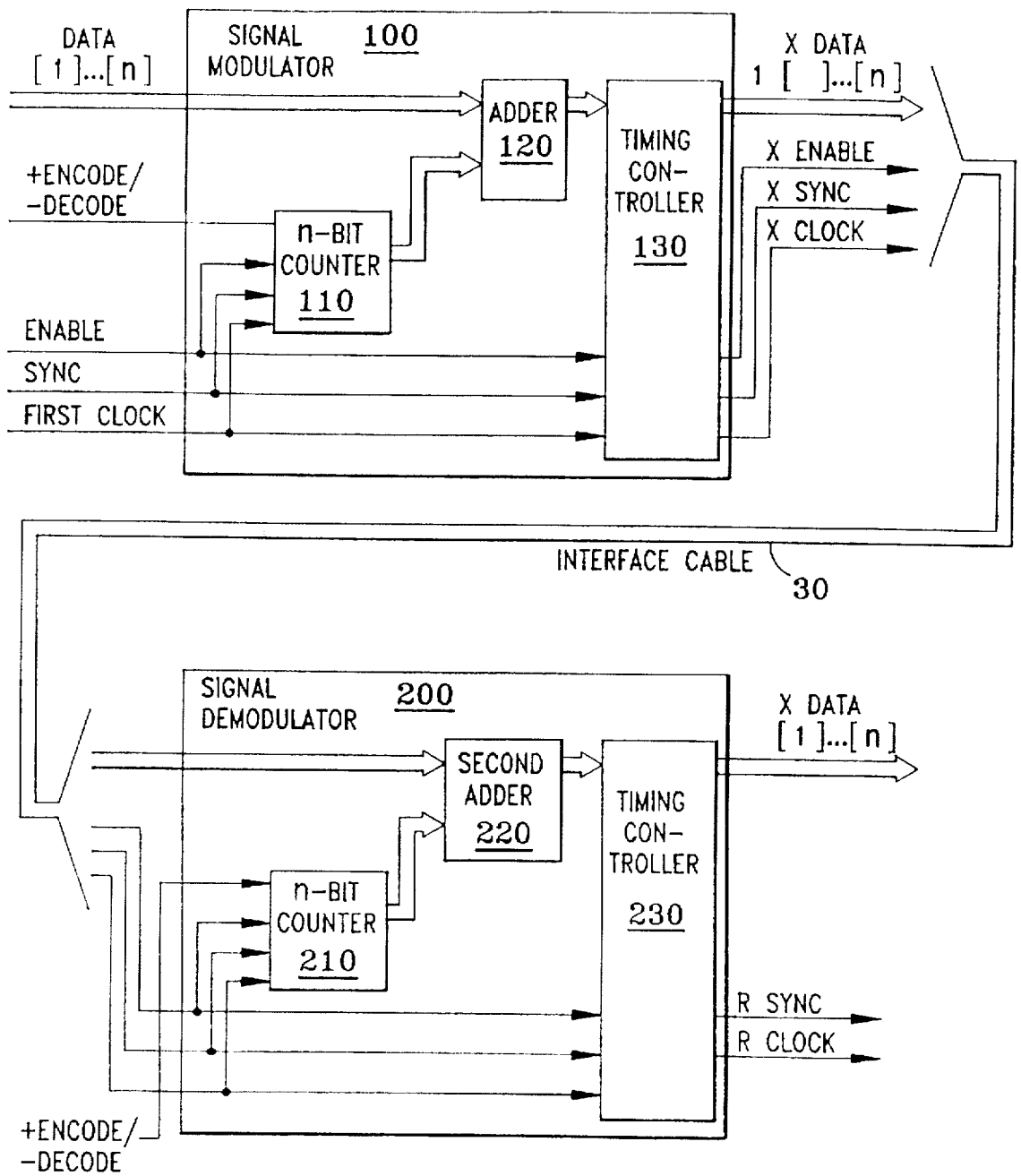
FIG. 2 is a diagram illustrating the arrangement of a transfer system according to the present invention.

The data transfer system 15 is shown in more detail in FIG. 2. As described above, the data transfer system 15 includes the signal modulator 100, the interface cable 30, and the signal demodulator 200. The individual circuit components of the signal modulator 100 are physically identical to those of the signal demodulator 200, and, accordingly, the circuit arrangements of both circuits are identical. As the identical arrangement is employed for both the signal modulator 100 and the signal demodulator 200, the function of either circuit is determined by the value of a control signal, i.e., the level of an "+encode/−decode" signal.

The signal modulator 100 and the signal demodulator 200, respectively, have n-bit counters 110 and 210, n-bit adders 120 and 220, and timing controllers 130 and 230. It should be noted that "n" denotes a bit count value for a data bus.

The n-bit counters 110 and 210 increment or decrement an initial value depending on whether the circuits 100 and 200 are employed as data modulators or data demodulators. Whether incrementing or decrementing is performed can be selected according to the level of a control signal "+encode/−decode." A high +encode/−decode signal enables the n-bit counters 110 and 210 to increment while a low +encode/−decode signal enables the n-bit counters 110 and 210 to decrement. The n-bit counters 110 and 210 are reset when a SYNC signal, one of the interface signals, is true, while they perform the increment or decrement function when a SYNC signal is false. The counters 110 and 210 each have a clock input for receiving the interface clock signal, which signal controls the timing of the increment and decrement functions, once enabled and reset.

With continued reference to FIG. 2, the adders 120 and 220 add the output values of the respective n-bit counters 110 and 220 to data [1] . . . [n] for every bit, including the carry.

The timing controllers 130 and 230 control the operational timing for the respective signal modulator 100 and the signal demodulator 200, so that the signal demodulator 200 correctly subtracts from data a value (the value output by the counter 110) that was previously added to data [1] . . . [n] by the signal modulator 100.

An enable signal is employed to determine whether or not the signal demodulator 100 and the signal demodulator 200 should modulate data and demodulate data, respectively. When a circuit, independent of these circuits (not shown), is employed that decodes data [1] . . . [n] of the interface signals and then determines whether or not data modulation should be performed, the output of the circuit is supplied as an enable signal to the circuits 100 and 200. For example, when all the bits of data [1] . . . [n] are not changed within a specified period of time, EMI radiation is low and data modulation by the circuit 100 is not required. The addition of an enable signal to the interface signals provides the ability to dynamically determine whether or not data modulation should be performed. The decision to invoke data modulation performed by the signal modulator 100 must be synchronized with the decision to invoke data modulation by the signal demodulator (receiver) 200.

Table 1 shows a data modulation method (randomization) for use with the arrangement in FIG. 2. An 8-bit parallel data interface example is employed in this case.

TABLE 1

| Data \|1\|...\|8\| | Count 1 | Xdata \|1\|...\|8\| | Count 2 | Rdata \|1\|...\|8\| |
|---|---|---|---|---|
| FF | 01 | 00 | FF | FF |
| 00 | 02 | 02 | FE | 00 |
| FF | 03 | 02 | FD | FF |
| 00 | 04 | 04 | FC | 00 |
| FF | 05 | 04 | FB | FF |

The columns of Table 1 represent the development over time of various signals. The first column of Table 1, "Data |1| . . . |8|," represents a data signal that is to be transmitted. "FF" is a number in the hexadecimal system that is equivalent to "11111111" in the binary system. In other words, the values of all the eight data bits are "1." The second column, "Count 1," represents the output value of the n-bit counter 110 in the signal modulator 100. Here, incrementation is performed. The third column, "Xdata [1] . . . |8|," represents a value that is obtained by adding the value of the data |1| . . . [8] in the first column to the output value of the counter 110 in the second column. The Xdata [1] . . . |8| are transmitted via the interface cable 30. The fourth column, "Count 2," represents the output value of the counter 210 in the signal demodulator 200. Since the signal modulator 100 has incremented the value of a signal, the demodulator 200 decrements the value of a signal. The fifth column, "Rdata [1] . . . [8]," represents the result that is obtained by adding the signal value for "Xdata [1] . . . [8]" to the counter output value "count 2" of the demodulator 200. This result serves as the output for the demodulator 200.

As described above, signals "data [1] . . . [8]," which are repeated rapidly and of which all the bits are operated with the same signal waveform, can be converted respectively into signals "Xdata [1] . . . [8]," which are operated with waveforms that differ from each other. Further, these modulated signals can be demodulated and the original signals can be recovered by the signal demodulator 200.

To perform the above modulation, the counter 110 of the signal modulator 100 must be fully synchronized with the counter 210 of the signal demodulator 200. The SYNC signal and the clock signal, which are included in the interface signals, are employed to synchronize the counters 110 and 210. Further, a circuit that controls the timing that accompanies this calculation for the circuit is necessary.

Figure 3:
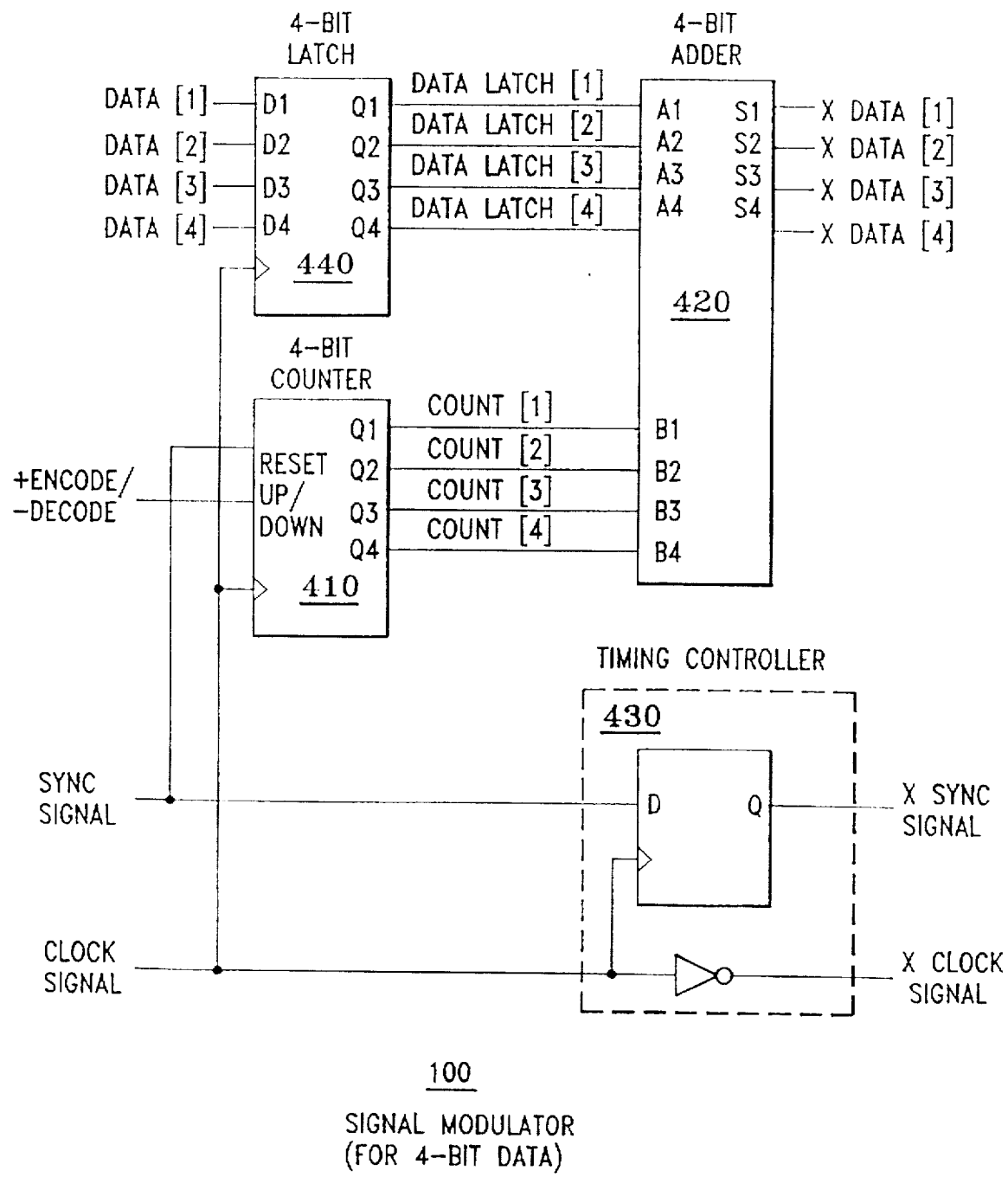
FIG. 3 is a diagram illustrating an exemplary circuit arrangement of the present invention for a 4-bit interface signal.

FIG. 3 is a diagram showing an exemplary embodiment of the signal modulator 100 for an interface that has a 4-bit data bus. It should be noted that the present invention is not limited to a 4-bit data bus. For purposes of clarity, an enable signal is not represented in FIG. 3.

Figure 4:
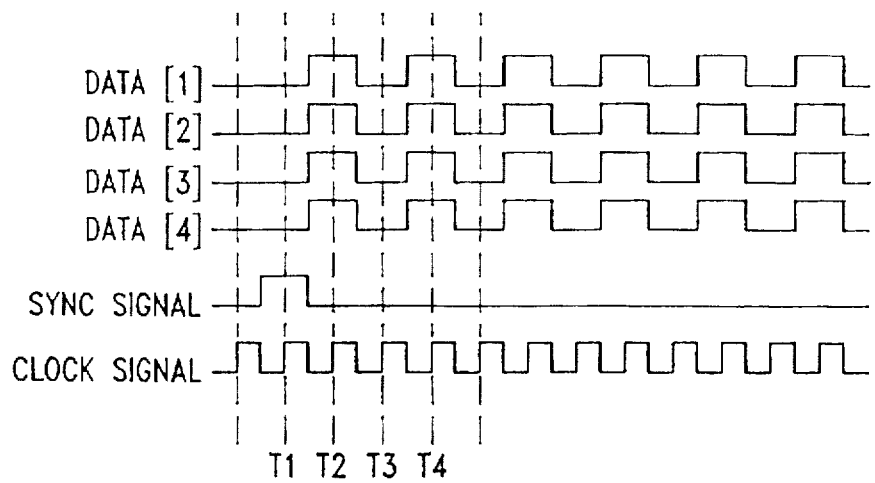
FIG. 4 is a timing diagram showing 4-bit interface signals.
Figure 12:
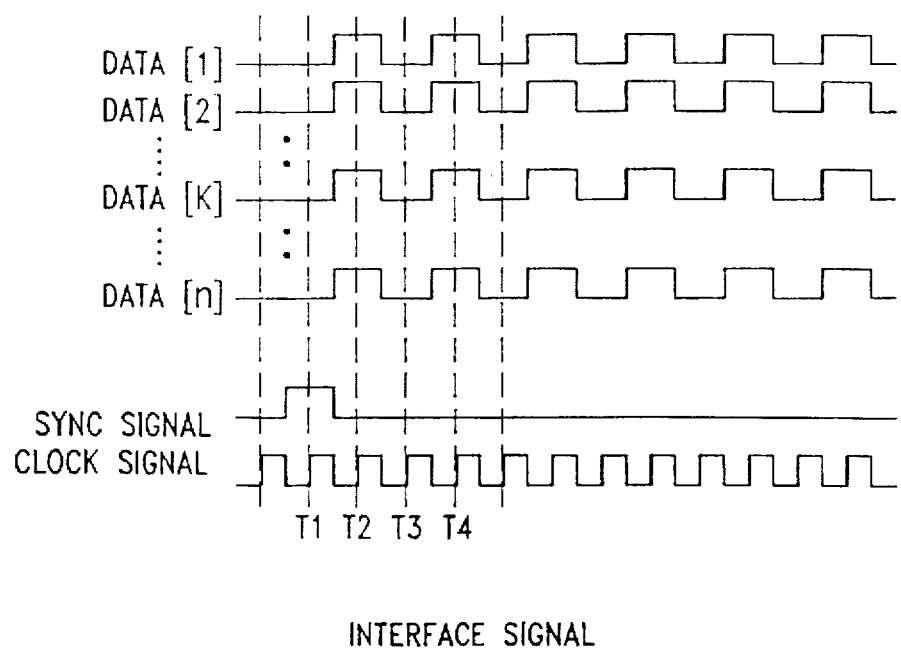
FIG. 12 is a timing diagram showing examples of interface signals.

FIG. 4 is a diagram showing the timing for 4-bit input signals. The signals shown in FIG. 4 correspond to data n=4 in the timing diagram of FIG. 12, and are the interface signals when data modulation is not performed by the signal modulator 100 (for 4-bit signals).

Figure 5:
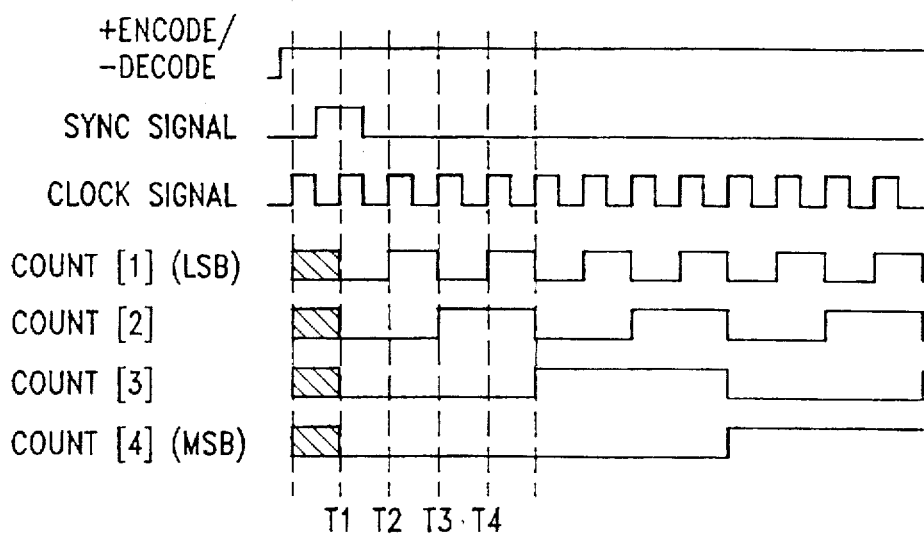
FIG. 5 is a timing diagram showing 4-bit interface signals obtained through modulation by the signal modulator of the present invention.

FIG. 5 shows the input/output signals of the 4-bit counter 410 depicted in FIG. 3 when the 4-bit counter 410 is in a signal modulation mode. In signal modulation mode, a value incrementation example is shown. When the SYNC signal is high, the counter 410 is reset and its output count values [1] . . . [4] are all zero. Since a +encode/–decode signal is true (high), the counter 410 increments beginning with an initial value, shown in FIG. 5 as "0001". The counter 410 begins counting with the rise of the clock signal at time T2. The count value |4| . . . |1| is "0001" at time T2, "0010" at time T3, and "0011" at time T4.

Figure 6:
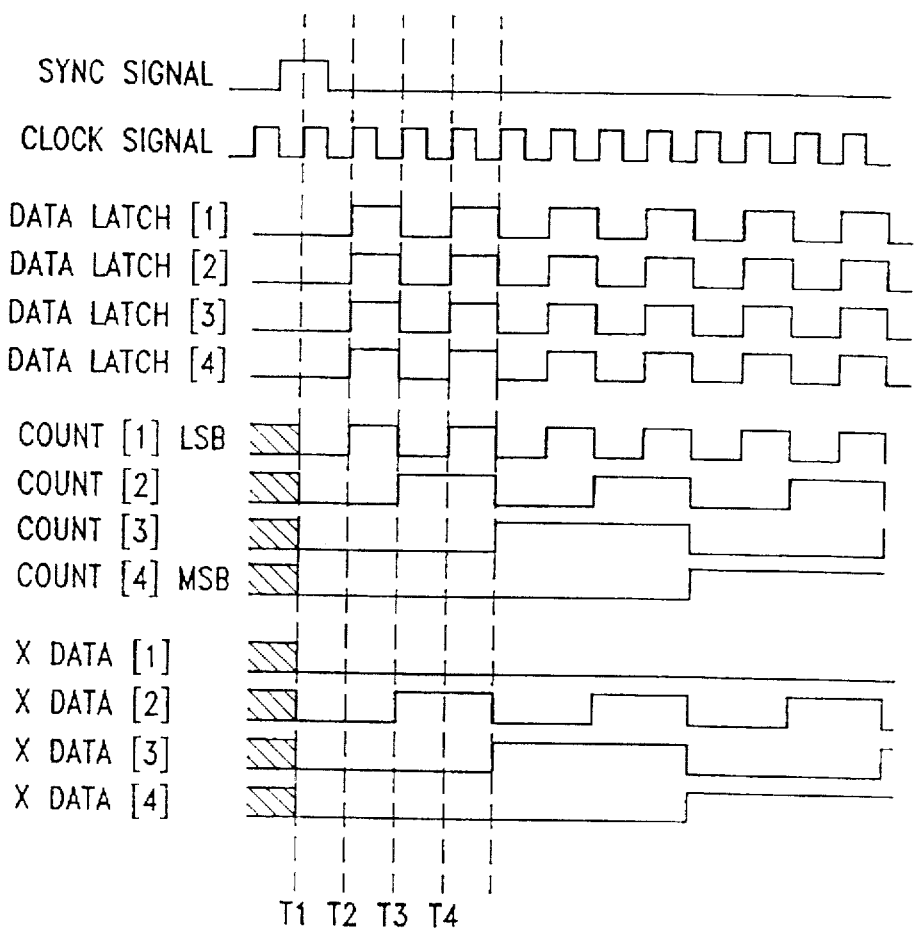
FIG. 6 is a timing diagram showing the timing for a counter and the output timings for signals input from an adder.

FIG. 6 is a timing diagram showing signals output by the adder 420 depicted in FIG. 3 as the result of the addition of the values output by the counter 410, count |1| . . . count |n|, to the input data |1| . . . |4|. Signals "data latch |1| . . . |4|" are those obtained by sampling input signals "data |1| . . . |4|" at the leading edges of the clock signal. Signals "Xdata |1| . . . |4|" are the outputs of the adder 420. The same data modulation as shown in Table 1 is performed.

Figure 7:
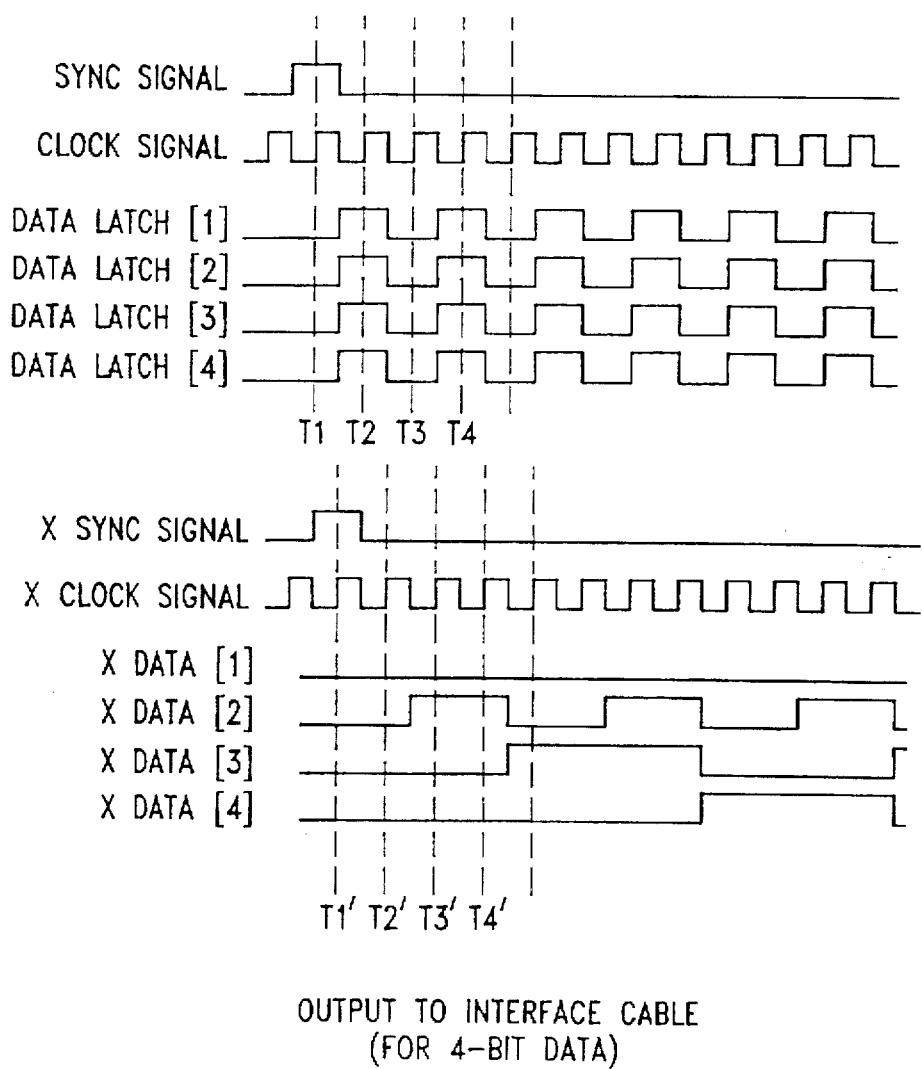
FIG. 7 is a timing diagram showing the timing for signals that are output to an interface cable via a timing controller, and the input signals shown in FIG. 4.

In FIG. 7 is shown the timing diagram for the output signals supplied to the interface cable 30 depicted in FIG. 2 via the timing controller 430 depicted in FIG. 3, as well as the input signals shown in FIG. 4. The X data are the modulated signals shown in FIG. 6. The XSYNC signal is a signal obtained by sampling a SYNC signal, which is input to the timing controller 430, at a time specified by the interface clock signal. The X clock signal is a signal obtained by inverting the polarity of the input clock signal. As is shown in FIG. 7, the modulated signal consists of X data, XSYNC, and X clock signals, which have the same general timing relationships as do the data, SYNC, and clock signals prior to modulation. It is therefore understood from such a timing analysis that the signal demodulator 200 can employ the same circuit arrangement as the signal modulator 100 to demodulate the received signals so as to recover the original signals.

Figure 8:
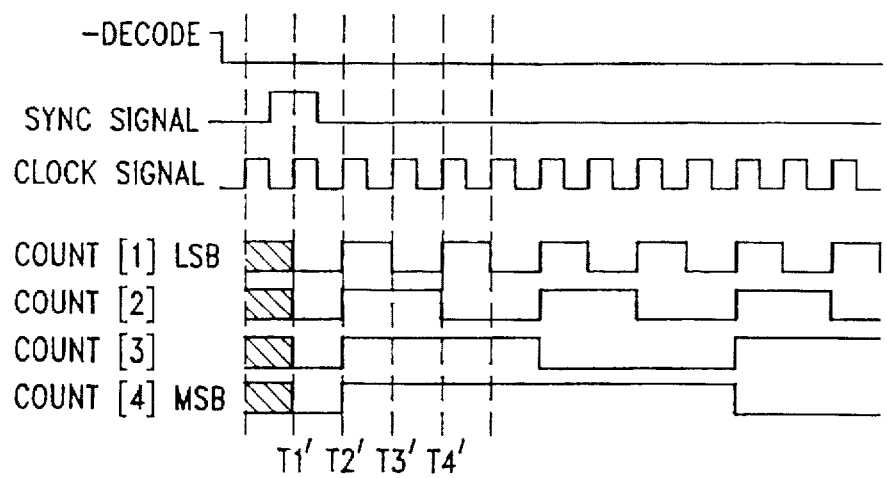
FIG. 8 is a timing diagram showing the operational timing for the counters in the demodulator.
Figure 9:
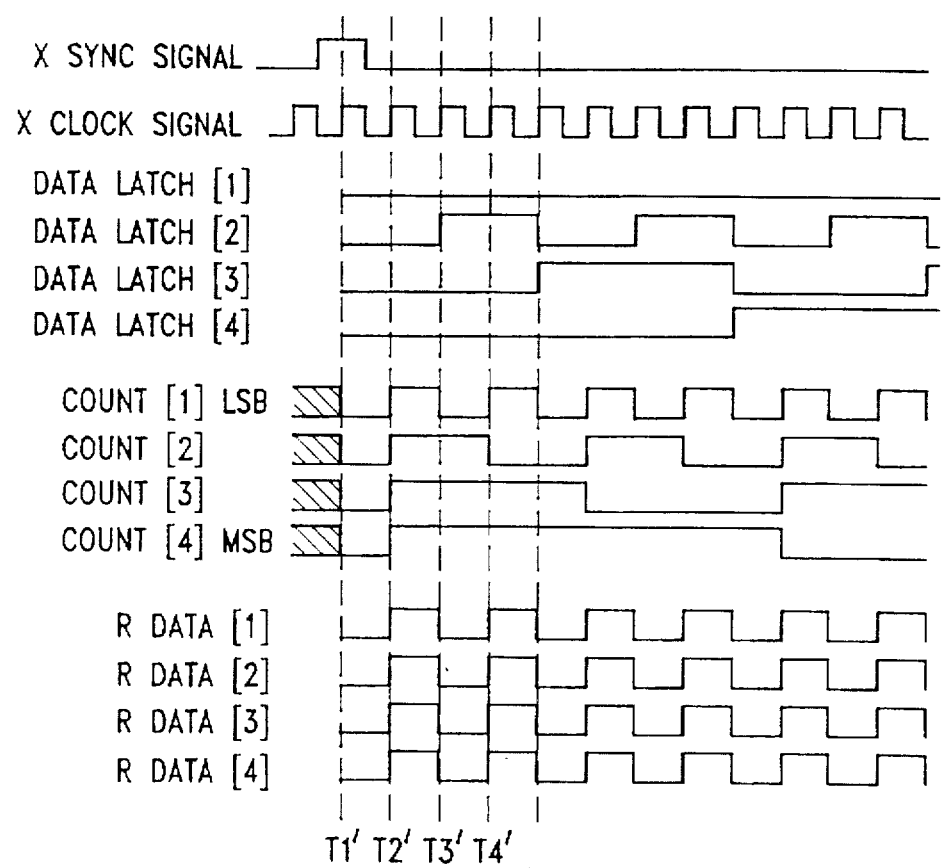
FIG. 9 is a timing diagram showing the output timing of an adder in the demodulator.
Figure 10:
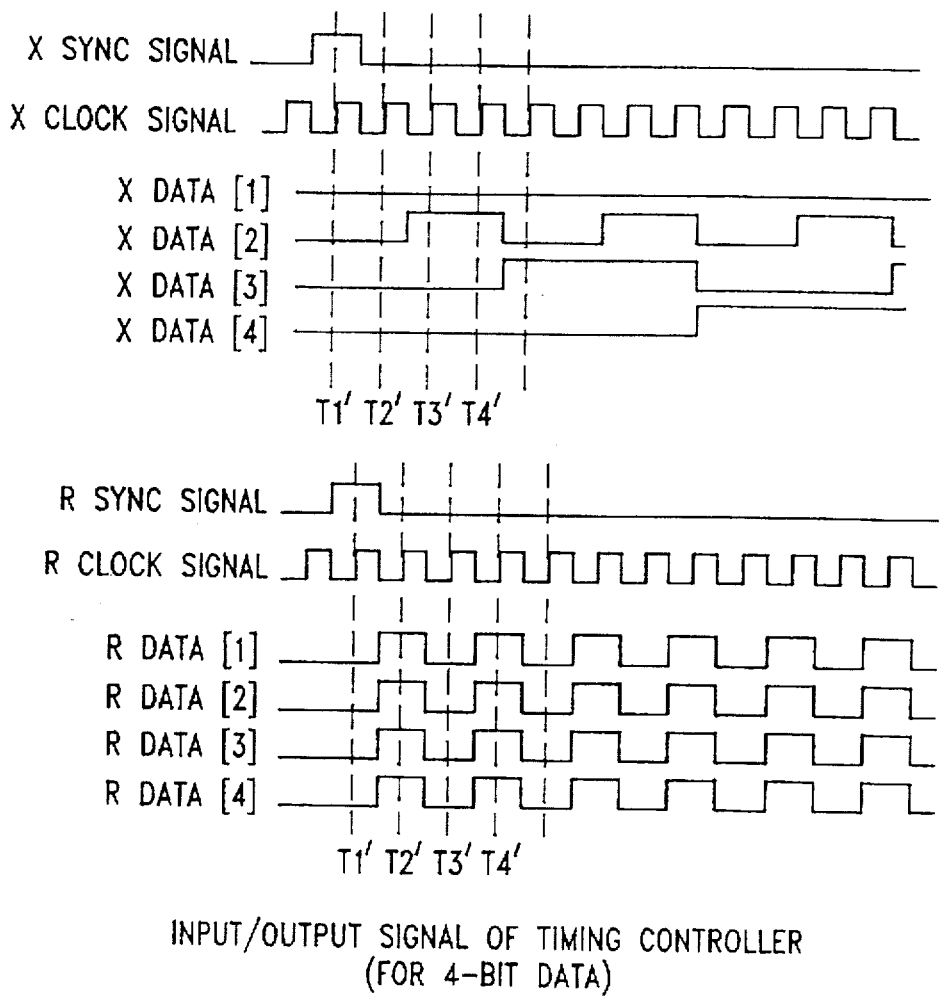
FIG. 10 is a timing diagram showing that data which are demodulated by the demodulator are thereafter processed by the timing controller to reproduce data, a clock signal, and a sync signal, that have the same timing relationships as their original transmission timing.

FIG. 8 shows the timing diagram for the input and output signals of the counter 210 of the demodulator 200 as depicted in FIG. 2. The operation of the signal demodulator 200 is exactly the same as that of the signal modulator, except that the counter 210 operates to decrement from an initial value, shown in FIG. 8 as "1111". FIG. 9 shows the input/output signals of an adder 220 of the demodulator 200. FIG. 10 shows data, clock, and SYNC signals, which have the identical transfer timings of the originals, that are reproduced by the timing controller 230 from the data demodulated by the demodulator 200.

EXAMPLE

Figure 11A:
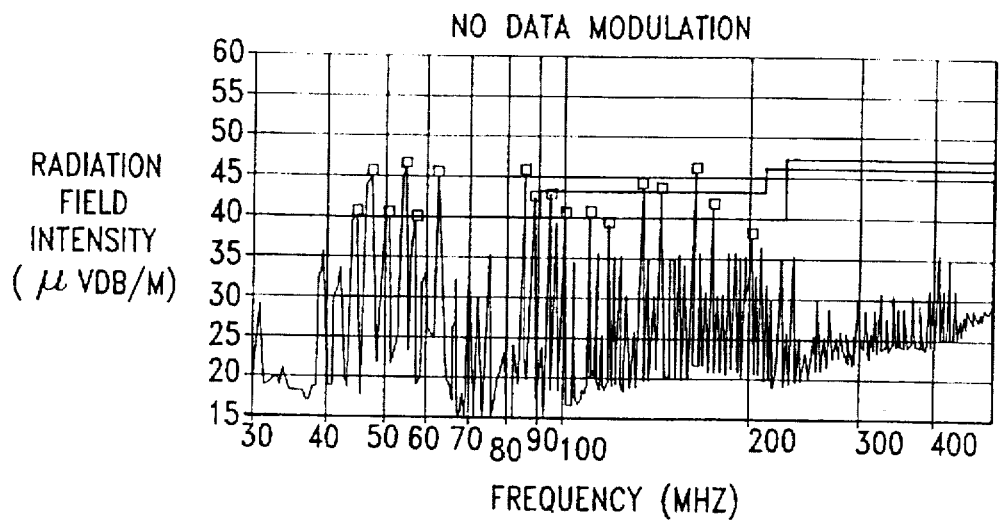
FIGS. 11A and 11B are graphs showing the results that were obtained by an experiment employing the circuit shown in FIG. 3 during which experiment EMI radiation was measured.
Figure 11B:
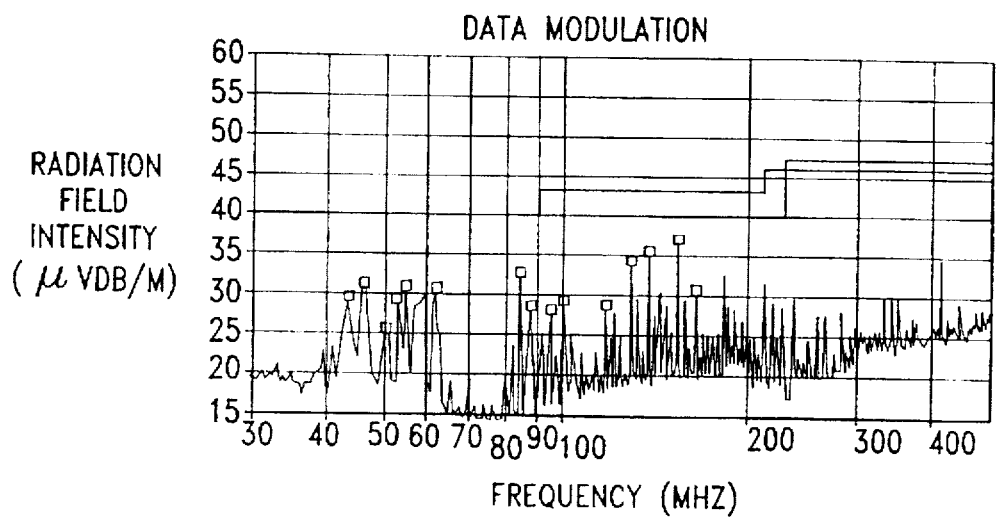

FIGS. 11A and 11B are graphs depicting the results of an experiment during which EMI radiation was emitted while using the circuit shown in FIG. 3. In this experiment, 4-bit parallel data were transmitted. The vertical axis represents the magnitude of the EMI radiation that was emitted, while the horizontal axis represent the frequency at which such magnitudes were measured. The heavy solid lines indicate specified limits for EMI radiation across the frequency range. For the experiment, data, F, F, 0, 0, 0, F, F, 0, were repeatedly transmitted. FIG. 11A shows the radiation characteristics of the above transmission pattern as a function of frequency when the circuit of FIG. 3 in NOT in modulation mode. FIG. 11B shows the radiation characteristics of the above transmission pattern as a function of frequency when the circuit of FIG. 3 is in modulation mode as described above. In comparing FIG. 11A to 11B it is apparent that the circuit of the present invention effectively reduces EMI radiation to a level well below the specified limit.

It would be obvious to one having ordinary skill in the art that the present invention is not limited to the above described embodiment. Although in this specification, the present invention is applied to a computer system, the present invention can be applied to other electronic devices. Further, although the signal modulator 100 and the signal demodulator 200 are arranged the same for the described embodiment, they may be arranged differently. In addition, although in this embodiment data modulation is performed by adding the counter output to the data, the output of a circuit, other than a counter, that repetitively outputs a specific pattern may be added instead. Data modulation may also be performed only on a part of a data signal.

According to the present invention, data are modulated (randomized) and the transmission of an identical signal over multiple signal lines of a bus is prevented, so that EMI radiation can be reduced. Further, for the reduction of EMI radiation, the deterioration of the quality of waveforms due to the installation of filters need not be taken into account. Further, the component count and the manufacturing cost can be reduced by attaching the above described circuit to an LCD interface circuit or by producing a dedicated chip.

What is claimed is:

1. A system for transmitting a plurality of data signals across parallel lines, the system comprising
   a circuit for selectively modulating the data signals prior to transmission such that the data signals of the plurality of data signals are carried by different waveforms, and
   a circuit for receiving and recovering the plurality of data signals by demodulating the data signals of the plurality of data signals.

2. The system as claimed in claim 1, wherein the circuit for selectively modulating modulates the data signals so that the signal waveform for modulated data signals on a first signal line of said parallel signal lines differs from signal waveforms for modulated data signals on a second signal line more than the signal waveform for unmodulated data signals on the first signal line differs from the signal waveform for unmodulated data signals on the second signal line.

3. The system as claimed in claim 1, wherein the data signal is an n-bit data signal, and wherein the circuit for selectively modulating comprises:
   a first n-bit counter for outputting a first n-bit offset; and
   a first arithmetic operation circuit coupled to the first n-bit counter, for modulating the n-bit data signals by combining the n-bit data signals with the first n-bit offset output by the first n-bit counter, and for outputting modulated data signals;
   and wherein the circuit for receiving and recovering the plurality of data signals comprises:
   a second n-bit counter for outputting, in synchronization with said first n-bit counter, a second n-bit offset complementary to the first n-bit offset output by the first n-bit counter; and
   a second arithmetic operation circuit, coupled to the second n-bit counter for receiving the modulated data signals and for combining the modulated data signals with the second n-bit offset output by the second n-bit counter thereby restoring the data signals to its original value.

4. The system as claimed in claim 1, wherein said parallel signal lines are part of a bus.

5. The system as claimed in claim 1, wherein said parallel signal lines are an interface cable.

6. Data transfer system comprising a system according to claim 1.

7. A method for transmitting a plurality of data signals across parallel signal lines, the method comprising the steps of:
   modulating each data signal of the plurality of data signals prior to transmission across the parallel data lines such that the data signals of the plurality of data signals are carried by different waveforms.
   transmitting the data signals across the data lines; and
   receiving and recovering the plurality of data signals by demodulating the data signals of the plurality of data signals.

8. The method as claimed in claim 7, wherein the step of modulating comprises selectively modulating the data signals so that the signal waveform for modulated data signals on a first signal line differs from the signal waveform for modulated data signals on a second signal line more than signal waveforms for unmodulated data signals on the first signal line would differ from signal waveforms for unmodulated data signals on the second signal line.

9. The method as claimed in claim 7, wherein the step of modulating each data signal comprises combining the data signals with a first offset to form modulated data signals, and the step of receiving and recovering the plurality of data signals comprises combining the modulated data signals with a second offset complementary to the first offset, thereby demodulating the modulated data signals.

* * * * *